Nov. 30, 1954     J. G. RUMMLER     2,695,660
CUTTING TORCH CONSTRUCTION
Filed July 28, 1949
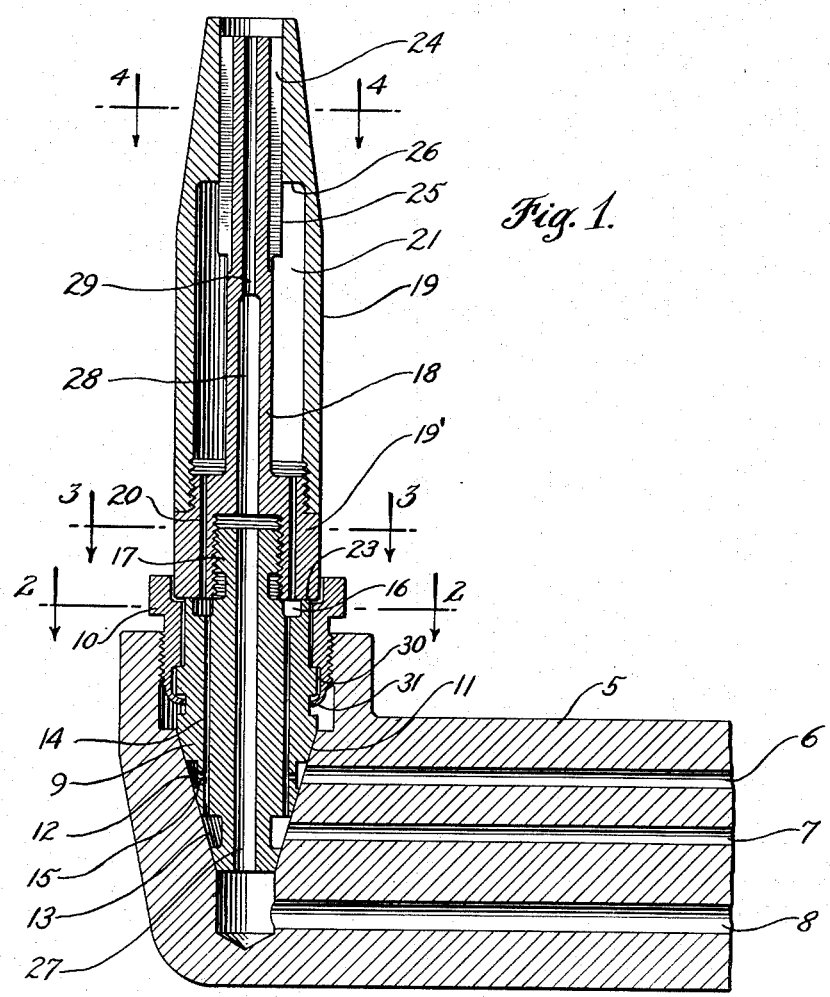
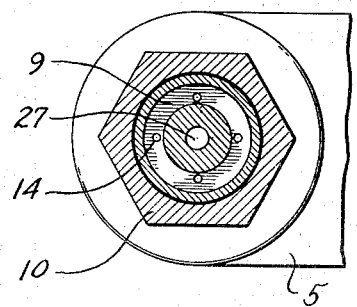
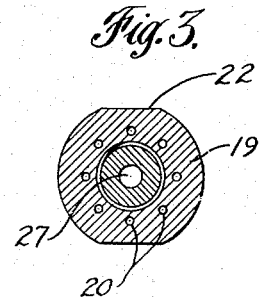
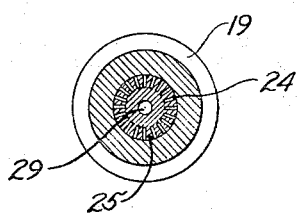
INVENTOR
John G. Rummler
BY
Harrie S. Campbell
ATTORNEY

United States Patent Office 2,695,660
Patented Nov. 30, 1954

2,695,660

CUTTING TORCH CONSTRUCTION

John G. Rummler, Ambler, Pa.

Application July 28, 1949, Serial No. 107,280

2 Claims. (Cl. 158—27.4)

This invention relates to improvements in construction for gas cutting torches and is particularly concerned with the construction and arrangement of parts composing the tip unit.

In most cutting torches a tip construction is used in which a single piece tip is attached to the torch handle by a retaining nut in a fashion to provide three separate delivery channels. These channels are for the delivery of the gas, the preheat oxygen which mixes with the gas as it passes through the tip unit and the cutting oxygen which passes through the tip unit in a separate channel to join the burning mixture at the tip outlet. The flow of the cutting oxygen is separately controlled and, upon operation of the control valve by the operator, a flame having an intense heat is generated to permit cutting operations in metal. One of the objects of the present invention is to provide a multiple part tip construction having properly shaped and properly related parts to provide for the development of increased heat at the tip to allow faster and better cutting action regardless of the type of gas being used.

Another object of the invention is to provide a separate adapter unit which may be attached to the torch handle by means of a connector nut with the tip proper attached to the adapter by separate attachment means. With this construction the adapter part containing the accurately machined seating surfaces for sealing the gas passages need not be discarded when it is necessary to replace the tip due to its deterioration by the heat of the cutting flame.

Another object of the invention is the provision of a two-piece tip unit which may be removed from the adapter as a single unit after which the tip may be disassembled.

A still further object of the invention is the provision of a tip construction which provides for improved mixing of the preheat oxygen and the cutting gas before it reaches the main passage in the tip unit. This improved mixing is particularly advantageous when using a type of gas stored in liquid form.

A still further object of the invention is the provision of an adapter unit and nut assembly which provides that the connecting nut unit may be turned separately from the tapered adapter unit, while at the same time the nut is prevented from separation by suitable construction of the related parts. This construction also assures that the tapered sealing portions of the adapter will be properly seated regardless of machining discrepancies between the tapered seat and threaded portions of the unit.

Particularly when using the types of fuel gas which are stored in a liquid form it is desirable to incorporate in the tip unit a storage chamber having considerable volume and from which the mixture of fuel gas and preheat oxygen passes through to the point of burning by means of relatively small sectional area passages at high velocity. In the type of tip unit of the present invention having internal and external tip parts, the desired velocity of flow may conveniently be obtained by a series of slots placed in radial position around the tip portion of the internal cylindrical tip member. It is an object of the present invention to provide proper proportions for the confined length of the tip passages to give improved flame characteristics and increased cutting effectiveness.

How the foregoing objects and advantages as well as others are attained will be clear from the following description of the drawing in which—

Figure 1 is a longitudinal sectional view through the outer portion of a cutting torch incorporating the features of the present invention.

Figure 2 is a sectional view taken along the lines 2—2, Figure 1, illustrating features of the adapter construction.

Figure 3 is a sectional view taken along the line 3—3, Figure 1, showing a portion of the inner tip member construction.

Figure 4 is a sectional view taken on the line 4—4, Figure 1, showing the construction of the tip unit near its outer end.

Referring to the figures, Figure 1 shows in section the tip of a cutting torch and a portion of a handle structure. The handle portion is shown at 5 and incorporates within it channels for the delivery of the gases used for cutting operations. Channel 6 provides for the delivery of the particular fuel gas being used for cutting purposes such as acetylene, acetogen and similar gases, which will burn at high temperatures. Acetylene gas is ordinarily stored in pressure containers in gaseous form, while acetogen represents the type of gases which are normally stored in pressure vessels in liquid form but which are delivered as a gas upon the reduction of pressure during operation of the apparatus. Channels 7 and 8 are for the delivery of oxygen, the preheat oxygen which combines with the gas flowing in through channel 6 being delivered through channel 7. The preheat oxygen and the fuel gas mix during their passage through the torch in a fashion which will be described later and the mixture burns at the tip outlet. An additional oxygen supply may be delivered through the channel 8 under the control of the operator. This supply of oxygen is turned on only when the cutting operation is in progress. When the additional oxygen is supplied through channel 8 a flame having a greatly increased temperature is produced at the tip to accomplish the burning or cutting action of the torch.

In order to provide for an improved tip construction and for improved delivery action to increase the efficiency of the cutting operation, two separate units are provided for effecting the delivery of the gases from the handle 5. The first unit is composed of an adapter member 9 and a retaining nut 10 which is provided with a male thread suitable for attaching to the handle or supporting part 5. The handle 5 is also provided with a tapered hole 11 into which the tapered portion of the adapter 9 fits. Annular passages 12 and 13 are formed in the tapered portion of the adapter unit to produce a series of seats. Drilled holes 14 lead from the annular groove 13 to the upper end of the adapter unit. Connecting openings 15 lead from the annular groove 12 into the drill holes 14. In this fashion the fuel gas and the preheat oxygen which are delivered through the handle in separate channels are brought together in the adapter unit. The mixture is delivered through the adapter by means of the four holes 14 (see Figure 2) and delivered to an annular chamber 16 formed in the end of the adapter unit 9. The adapter unit is equipped with a threaded portion 17 having a male thread suitable for engaging the tip assembly and holding it in position on the adapter.

The tip assembly is preferably made in two parts, an internal member 18 and an external shell member 19. The internal member 18 expands at the inner end next the adapter into an enlarged portion as illustrated at 19' suitable for providing for the internal thread to engage the adapter part 17. This portion also incorporates the delivery holes 20 which lead from the annular chamber 16 to the main chamber 21 which is formed between the inner and outer portions 18 and 19' of the tip unit. An internal thread at the inner end of the outer shell 19 attaches the outer tip member to the enlarged portion 19' of the inner tip member. In this fashion a unitary assembly of the tip parts may be made so that the complete tip unit may be attached to the adapter 9 in one operation. Flat surfaces 22 (see Figure 3) are provided in the enlarged portion 19' of the inner member for the purpose of permitting the use of a wrench for tightening or loosening the tip assembly. It will be noted that the inner end of the tip portion 19' engages an annular lip 23 on the adapter unit 9 to provide for sealing action between the adapter unit and the tip assembly. It will also be noted that eight holes 20 are shown in the tip portion 19' for delivering the mixed gases from the annular chamber 16 to the main chamber 21, whereas only four holes are shown in the adapter unit 9.

With this two-piece tip construction the mixing chamber 21 may be readily manufactured to any desired proportion to give the size of passageway or chamber needed for best results. In the type of tip illustrated which is particularly suited for use with acetogen gas a relatively large chamber is shown to produce the characteristics desired when using this type of gas. This same general type of tip construction is readily adapted to provide variations in internal tip characteristics. For example, to produce a tip specifically suited for use with acetylene the internal bore of the outer portion 19 would be reduced and the diameter of the shank portion of the internal tip member 18 would be increased to the extent desired to give proper operational characteristics with the acetylene gas. Intermediate proportions for other types of gas may be readily constructed using the same basic type of construction for the tip assembly.

The delivery of the mixture of fuel gas and oxygen from the internal chamber 21 to the tip where burning occurs, is controlled by means of a series of openings. These are clearly illustrated in Figure 4 in which it will be seen that narrow slots 24 are provided in the cylindrical tip portion 25 of the inner tip member 18. The cylindrical portion 25 of the inner tip member fits accurately in the hole provided in the outer tip member 19 so that the gas from chamber 21 is delivered in a series of jets of relatively high velocity annularly spaced around the opening. In order to provide proper flow characteristics of the gas from the jets the cylindrical portion of the hole in the outer member 19 extends inwardly to shoulder 26. In the present illustration, the length of this channel is indicated as being slightly over two diameters, which length has been found to give highly efficient burning action.

The delivery of the cutting oxygen from the handle channel 8 is effected in direct fashion through the central hole 27 in the adapter unit 9 and the drilled hole 28 in the inner tip unit 18. The final delivery hole 29 is shown smaller in diameter to provide for increased velocity at the point of exit.

With this tip delivery arrangement improved mixing of the fuel gas is obtained. The delivery of the fuel gas and oxygen through the annular chamber 16 produces increased mixing action which is further enhanced by the increased number of outlet holes whereby the gas is encouraged to flow annularly in the chamber 16. Delivery through the carefully proportioned chamber 21 further completes the mixing action in an effective manner.

By providing a separate tip assembly, replacement of either the outer member 19, or the tip assembly of both the outer and inner unit 18 and 19, may be made without the need for replacing the expensive machined seat portion since in the present construction this is furnished as a separate member. Furthermore, in removing the tip unit for cleaning or replacement, the adapter unit with its carefully formed sealing surfaces need not be disturbed with the result that the life of this part is greatly increased. It will also be noted that the retaining nut for the adapter unit is provided with radial clearance so that should there be a slight eccentric relationship between the threaded hole in the handle part and the tapered sealing portion of the adapter accurate seating action may still be obtained. The nut 10 applies the retaining pressure to the adapter unit through the medium of shoulder 30. A lip 31, which may be rolled after assembly of the two parts 9 and 10, is provided to cause the adapter 9 to be withdrawn when the nut 10 is removed. This construction provides a unitary assembly of the adapter and nut part and prevents accidental loss of the nut 10.

With my improved type of cutting torch tip construction better cutting results are obtained as the result of the better mixing action of the gas and its manner of delivery from the tip. Comparative tests with other equipment have shown increased cutting speeds with no increase in volume of gas used. In addition to the increased efficiency of operation my improved cutting torch permits a distinct saving in cost of replacement parts. Only tip unit parts affected by the burning action need be replaced. The manner of disconnecting the tip unit independently from the disconnection of the adapter unit from the handle allows removal of the tip unit without disturbing the adapter. The assembly of the outer tip member and the inner tip member in the fashion disclosed in the present application allows the two tip parts to be disassembled either before or after they are removed from the cutting torch. This construction also allows considerable variation in the design of the tip particularly with respect to the proportioning of the inner chamber.

I claim:
1. For a cutting torch, a handle member having a female tapered seat, an adapter part having a tapered male seat to fit in said handle member, an attaching nut rotatably connected to said adapter part, said attaching nut having a thread engaging said handle member and having a shoulder engaging said adapter part to force it into engagement against said seat upon rotation of the attaching nut in the tightening direction, a second shoulder in the form of an inturned flange engaging said adapter part for releasing it from said tapered seat upon rotation of the nut in the releasing direction, said adapter part having a projecting male thread portion of reduced diameter at its outer end, a two-piece tip assembly composed of an inner spindle part and an outer shell in threaded engagement with said spindle part, and a female thread on said spindle part adapted to engage the male thread on said adapter part to permit unitary assembly and disassembly of the tip unit.

2. A cutting torch assembly incorporating a supporting member having a tapered opening therein, a tapered adapter to fit in said opening, a threaded nut part to retain said adapter in said supporting member, said adapter having an extending portion having a male thread, said adaptor having a groove near the extending portion, a tip unit having an elongated internal part with a female thread for attaching to the male thread of said adapter, an external tip shell surrounding the major portion of said internal part to form an annular chamber therebetween, said shell being connected to said internal part by a threaded connection, said internal part having a series of parallel holes leading from said groove to said annular chamber, an annular seating surface between said adapter and said elongated tip part located outwardly of the groove in said adapter.

References Cited in the file of this patent

UNITED STATES PATENTS

| Number | Name | Date |
|--------|------|------|
| 981,342 | Williams | Jan. 10, 1911 |
| 1,926,438 | Fausek et al. | Sept. 12, 1933 |
| 1,949,780 | Campbell | Mar. 6, 1934 |
| 1,955,120 | Fausek et al. | Apr. 17, 1934 |
| 1,958,044 | Henricks | May 8, 1934 |
| 2,080,396 | Campbell | May 18, 1937 |
| 2,157,269 | Richter | May 9, 1939 |
| 2,378,346 | Wigton | June 12, 1945 |